(12) United States Patent
Bajaj

(10) Patent No.: US 8,075,745 B2
(45) Date of Patent: Dec. 13, 2011

(54) ELECTRO-METHOD AND APPARATUS FOR IMPROVED CHEMICAL MECHANICAL PLANARIZATION PAD WITH UNIFORM POLISH PERFORMANCE

(75) Inventor: Rajeev Bajaj, Fremont, CA (US)

(73) Assignee: Semiquest Inc., San Jose, CA (US)

( * ) Notice: Subject to any disclaimer, the term of this patent is extended or adjusted under 35 U.S.C. 154(b) by 1092 days.

(21) Appl. No.: 11/576,942

(22) PCT Filed: Oct. 5, 2005

(86) PCT No.: PCT/US2005/035660
§ 371 (c)(1),
(2), (4) Date: Oct. 16, 2007

(87) PCT Pub. No.: WO2006/057713
PCT Pub. Date: Jun. 1, 2006

(65) Prior Publication Data
US 2008/0164153 A1    Jul. 10, 2008

Related U.S. Application Data

(60) Provisional application No. 60/631,189, filed on Nov. 29, 2004, provisional application No. 60/639,257, filed on Dec. 27, 2004.

(51) Int. Cl.
*C25F 7/00* (2006.01)
(52) U.S. Cl. .................. 204/224 M; 204/252; 204/282; 205/663
(58) Field of Classification Search .............. 204/224 M, 204/252, 282; 205/663
See application file for complete search history.

(56) References Cited

U.S. PATENT DOCUMENTS

| | | |
|---|---|---|
| 5,212,910 A | 5/1993 | Breivogel et al. |
| 5,489,233 A | 2/1996 | Cook et al. |
| 5,607,346 A | 3/1997 | Wilson et al. |
| 5,609,517 A | 3/1997 | Lofaro |
| 5,795,218 A | 8/1998 | Doan et al. |
| 5,893,976 A | 4/1999 | Bauer |
| 6,019,666 A | 2/2000 | Roberts et al. |

(Continued)

FOREIGN PATENT DOCUMENTS
JP    2001071256 A    3/2001

OTHER PUBLICATIONS

Bajaj, Rajeev; PCT/US05/35978 filed Oct. 5, 2005; International Preliminary Report on Patentability; WIPO; Jun. 7, 2007; 7pp.

(Continued)

*Primary Examiner* — Alexa D. Neckel
*Assistant Examiner* — Nicholas A. Smith
(74) *Attorney, Agent, or Firm* — SNR Denton US LLP

(57) ABSTRACT

A polishing pad includes a guide plate having a plurality of holes therein and being affixed to a compressible under-layer; and a plurality of conducting polishing elements each affixed to the compressible under-layer and passing through a sealed contact with a proton exchange membrane and corresponding hole in the guide plate so as to be maintained in a substantially vertical orientation with respect to the compressible under-layer but being translatable in a vertical direction with respect to the guide plate. The polishing pad may also include a slurry distribution material fastened to the guide plate by an adhesive. Pad wear sensors may also be provided in the polishing pad.

19 Claims, 7 Drawing Sheets

U.S. PATENT DOCUMENTS

| | | | |
|---|---|---|---|
| 6,024,630 A | 2/2000 | Shendon et al. | |
| 6,089,965 A | 7/2000 | Otawa et al. | |
| 6,090,475 A | 7/2000 | Robinson et al. | |
| 6,498,101 B1 | 12/2002 | Wang | |
| 6,612,916 B2 | 9/2003 | Kollodge et al. | |
| 6,794,605 B2 | 9/2004 | Park et al. | |
| 6,962,524 B2 | 11/2005 | Butterfield et al. | |
| 6,986,705 B2 | 1/2006 | Preston et al. | |
| 7,020,306 B2 | 3/2006 | Hirose et al. | |
| 7,192,340 B2 | 3/2007 | Ono et al. | |
| 7,815,778 B2 * | 10/2010 | Bajaj | 204/224 M |
| 7,846,008 B2 * | 12/2010 | Bajaj | 451/6 |
| 2001/0035354 A1 | 11/2001 | Ashjaee et al. | |
| 2001/0039175 A1 | 11/2001 | Golzarian et al. | |
| 2002/0025763 A1 * | 2/2002 | Lee et al. | 451/41 |
| 2002/0173255 A1 | 11/2002 | Shendon et al. | |
| 2003/0132103 A1 * | 7/2003 | Kobata et al. | 204/242 |
| 2003/0132120 A1 | 7/2003 | Emesh et al. | |
| 2003/0153245 A1 | 8/2003 | Talieh et al. | |
| 2003/0209528 A1 | 11/2003 | Choo et al. | |
| 2004/0110381 A1 | 6/2004 | Yoshida | |
| 2004/0166779 A1 | 8/2004 | Balijepalli et al. | |
| 2004/0232121 A1 | 11/2004 | Park et al. | |
| 2006/0079159 A1 | 4/2006 | Naujok et al. | |

OTHER PUBLICATIONS

Bajaj, Rajeev; PCT/US05/35979 filed Oct. 5, 2005; International Preliminary Report on Patentability; IPEA/US; Sep. 27, 2006; 7pp.

Bajaj, Rajeev; PCT/US05/35732 filed Oct. 5, 2005; International Preliminary Report on Patentability; WIPO; Jun. 7, 2007; 5pp.

Bajaj, Rajeev; PCT/US05/35660 filed Oct. 5, 2005; International Preliminary Report on Patentability; WIPO; Jul. 19, 2007; 6pp.

Bajaj, Rajeev, PCT/US05135978, International Search Report and Written Opinion, Mar. 15, 2006, 10pp, International Searching Authority-US, Alexandria, Virginia.

Bajaj, Rajeev, PCT/US05/35979 filed Oct. 5, 2005, International Search Report and Written Opinion, Feb. 24, 2006, 8pp, International Searching Authority-US, Alexandria, Virginia .

Bajaj, Rajeev, PCT/US05/35372 filed Oct. 5, 2005, International Search Report and Written Opinion, Nov. 28, 2006, 6pp, International Searching Authority-US, Alexandria, Virginia.

Bajaj, Rajeev, International Search Report and Written Opinion, PCT/US05/35660, Jun. 15, 2007, 8pp, ISA/US.

* cited by examiner

ELECTRO-METHOD AND APPARATUS FOR IMPROVED CHEMICAL MECHANICAL PLANARIZATION PAD WITH UNIFORM POLISH PERFORMANCE

RELATED APPLICATIONS

This application is a U.S. National Stage of PCT/US05/35660, filed 5 Oct. 2005, which claims the priority benefit of and incorporates by reference U.S. Provisional Patent Application No. 60/631,189, filed Nov. 29, 2004 and U.S. Provisional Patent Application No. 60/639,257, filed Dec. 27, 2004; all of which is incorporated herein by reference.

FIELD OF THE INVENTION

The present invention relates to the field of chemical mechanical planarization (CMP) and relates specifically to a polishing pad for use in ECMP (electro-chemical mechanical planarization) processing, said pad having uniform or near uniform polishing performance across its surface.

BACKGROUND OF THE INVENTION

In modern integrated circuit (IC) fabrication, layers of material are applied to embedded structures previously formed on semiconductor wafers. Chemical mechanical planarization (CMP) is an abrasive process used to remove these layers and polish the surface of a wafer flat to achieve the desired structure. CMP may be performed on both oxides and metals and generally involves the use of chemical slurries applied via a polishing pad that is moved relative to the wafer (e.g., the pad may rotate circularly relative to the wafer). The resulting smooth, flat surface is necessary to maintain the photolithographic depth of focus for subsequent steps and to ensure that the metal interconnects are not deformed over contour steps.

As CMP is a chemical-mechanical process, planarization/polishing performance is impacted by the mechanical properties and slurry distribution ability of the polishing pad. Polishing slurries are formulated to create passivation layers on the surface of the wafer, which passivation is removed by the mechanical action of the pad. Higher points on the wafer surface are subject to higher local pressures while lower points are protected by the passivation and the inability of the pad to reach such points. Complicating this process is the ever more prevalent use of low-K materials in modern integrated circuits. Such materials are mechanically fragile and, therefore, require that CMP processes use low down force (i.e., low compressive forces when the wafer is held against the pad during polishing operations).

FIG. 1 illustrates the surface of post-CMP copper wafer polished with a conventional polishing pad alone. As shown, the low K dielectric material 102 is capped with a protective dielectric 104 (such as silicon dioxide, silicon nitride or silicon carbide). Copper features 106 are etched into the dielectric stack. After polishing, besides dishing and erosion, damage to the dielectric stack is seen in the form of material damage 108 or delamination 110.

Conventional polishing pads are typically made of urethanes, either in cast form and filled with micro-porous elements or from non-woven felt coated with polyurethanes. During polishing, the pad surface undergoes deformation due to polishing forces. The pad surface therefore has to be "regenerated" through a conditioning process. The conditioning process involves pressing a fine, diamond covered disc against the pad surface while the pad is rotated much like during the polishing processes. The diamonds of the conditioning disc cut through and remove the top layer of the polishing pad, thereby exposing a fresh polishing pad surface underneath.

These concepts are illustrated graphically in FIGS. 2A-2C. In particular, FIG. 2A illustrates a side cutaway view of a new polishing pad 200. Polishing pad 200 contains microelements 204, and grooves 206, much like those found in commercially available polishing pads such as the IC1000 of Rhom & Haas, Inc. FIG. 2B shows the surface 202 of polishing pad 200 after polishing. The top surface of the pad shows degradation 208, especially around the microelements 204 where the edges are degraded due to plastic or viscous flow of the bulk urethane material. FIG. 2C shows the surface 202 of the polishing pad after a conditioning process has been completed. Note the depth of grooves 206 is lower than was the case for the new pad illustrated in FIG. 2A due to material removal during conditioning.

Over multiple cycles of polishing and conditioning, it is usually the case that the overall thickness of a pad wears up to a point such that the pad needs to be replaced. It is evident to those practicing in the art that pad wear rates differ from pad to pad and may also differ from one batch of pads to another batch. Currently no quantitative method exists to determine pad wear, hence end of pad life. Instead, the end of pad life is typically based on visual inspection of the pad surface to check for remaining groove depth. In the case of an un-grooved pad, end of pad life decisions are typically based on the number of wafers polished or the time elapsed since the pad was first put in service. Because such metrics are not particularly accurate it is desirable that a consistent, quantitative means to determine "end of pad life" be implemented. That is, a method based on finite wear of the pad surface would be useful in establishing a consistent basis for pad changes.

SUMMARY OF INVENTION

A polishing pad configured according to an embodiment of the present invention includes a guide plate having a plurality of holes therein and being affixed to a compressible under-layer; and a plurality of conductive polishing elements each affixed to the compressible under-layer and passing through a proton exchange membrane and a corresponding hole in the guide plate so as to be maintained in a substantially vertical orientation with respect to the compressible under-layer but being translatable in a vertical direction with respect to the guide plate. The polishing pad may also include a slurry distribution material fastened to the guide plate by an adhesive. The proton exchange membrane may be adjacent to the guide plate.

In various embodiments, the pad may include a pad wear sensor embedded at a depth from a top surface of the pad as measured from a working end of one or more of the polishing elements. The pad wear sensor may be an optically transparent plug having a top surface covered with reflective coating; a number of optically transparent plugs embedded to different depths within the pad; an optically transparent conical plug mounted flush with the top surface of the pad surface; an optically transparent plug having a multi-step surface configured to be exposed to varying degrees as the pad wears; or an optically transparent plug containing screens with varying degrees of transmission arranged in order of reflectivity. In still further embodiments, the pad wear sensor may be an electrochemical sensor containing two or more probes embedded in the pad, or a conductive plate embedded at a depth below the surface of the pad.

BRIEF DESCRIPTION OF THE DRAWINGS

The present invention is illustrated by way of example, and not limitation, in the figures of the accompanying drawings, in which.

DETAILED DESCRIPTION

Figure 1:
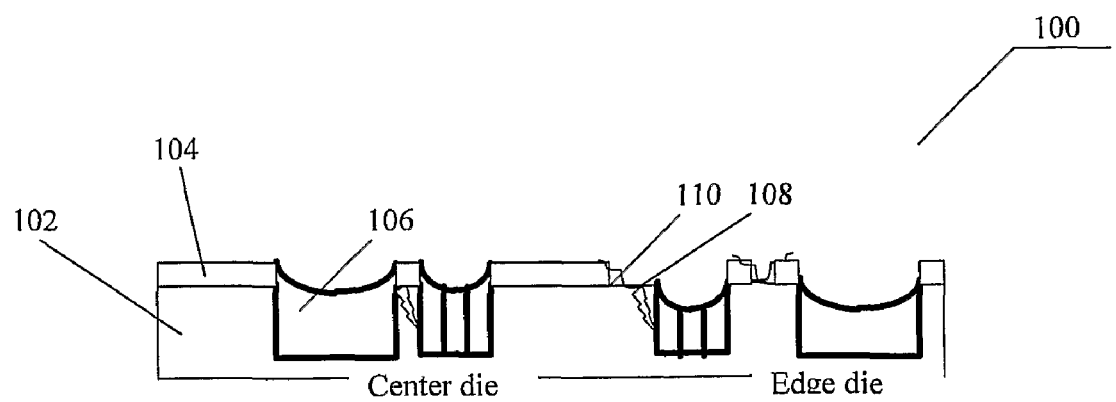
FIG. 1 illustrates the effects of dishing, erosion and other damage to a surface of a wafer that occurs during conventional CMP operations.
Figure 2A:
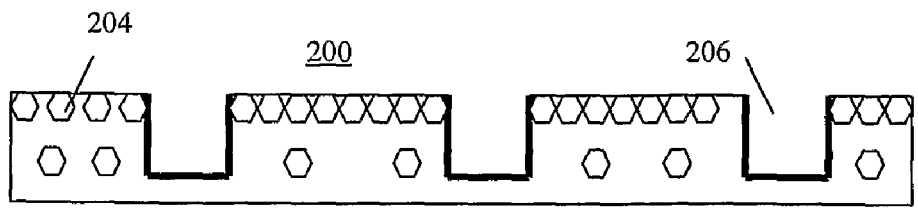
FIGS. 2A-2C illustrate concepts of pad wear experienced by conventional polishing pads.
Figure 2B:
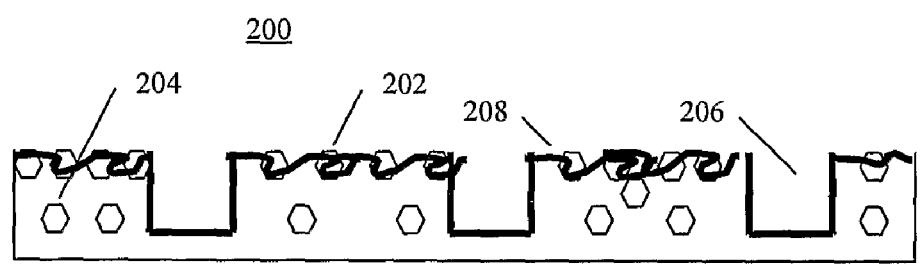
Figure 2C:
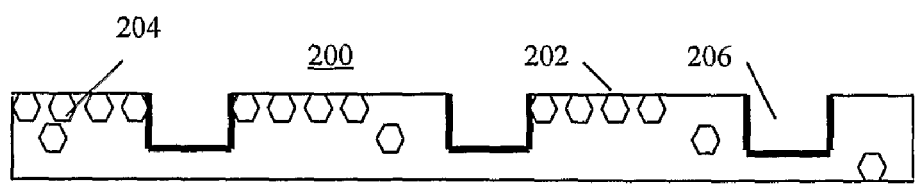

Described herein are an improved electro-chemical mechanical polishing pad capable of providing uniform (or near uniform) pressure across a wafer surface during electro-chemical mechanical planarization (ECMP) operations, and a corresponding method of polishing a wafer using such a pad. In one embodiment of the present invention, the pad is placed on a polish table while a wafer is pressed against the polishing pad with a down force suitable to ensure good contact between the wafer and the conductive polishing elements of the pad. An anodic electrochemical solution is applied to the pad surface while a cathodic solution is supplied to the lower side of the pad while it is rotated against the wafer.

An ECMP pad configured according to an embodiment of the present invention includes a fluid distribution layer connected to a guide plate, which is itself mounted on a housing. Polishing elements are placed through holes in the guide plate and a proton exchange membrane onto a compressible underlayer positioned between the guide plate and the housing. The polishing elements are therefore free to move in the vertical direction, independent of any neighboring elements. During polishing operations the polishing elements each apply local pressure to the wafer to achieve good planarity, while their independent functioning allows for good with-in wafer non-uniformity (WIWNU).

The conductive polishing elements are sealed as they pass through the proton exchange membrane and project to either side of the membrane—providing a short path contact from the anodic side of the pad to its cathodic side. When a wafer is placed on top of the conductive polishing elements the electrochemical circuit is completed, causing the metal film on the wafer to dissolve into the anodic solution while a reduction reaction is observed on cathode. In the case of copper film for example, the anodic solution may be copper sulfate or sulfuric acid while the cathodic solution may be silver nitrate. The anodic solution may or may not contain an inhibitor to limit the removal of copper.

The removal rate of the copper is regulated by a variety of factors, including: the number of contact points, the strength of the anodic and cathodic solutions, and the distance between the copper anode and cathode. The advantage of this system is that the potential for the copper surface is set through the electrochemical phenomena and is invariant. The removal process is automatically terminated once an alternate material, such as a barrier layer, is exposed. Overall the electrochemical process may be described by two half reactions:

| Anode: $Cu \rightarrow Cu^{2+} + 2e$ | $E = -0.337$ V |
|---|---|
| Cathode: $Ag^+ + 1e \rightarrow Ag$ | $E = +0.799$ V |

$E$ cell $= 0.799 + (-0.337) = 0.462$ V

The cell potential indicates the above-described reaction will occur to completion i.e., copper will go into solution while silver will plate from the solution. This ECMP pad structure achieves removal of copper at contact points through the above reaction but it is also true that any suitable cathodic half-cell can be used to achieve copper removal with the present pad.

The polishing elements apply local pressure to the wafer to achieve electrical contact and initiate removal. Since removal is electrochemically driven, pressure or down force is used only to ensure good contact between the polishing elements and the wafer and not for removal, consequently only very low down force is required to achieve desired planarization results. Further, by providing for independent movement of the polishing elements along a vertical axis, the present polishing pad is able to apply uniform (or near uniform) pressure across the entire surface of the wafer. This unique ability eliminates "hot spots" on the wafer which might cause local material removal rate variations or, in case of low-K materials, initiate material or interface failure damage. As will be evident to those of ordinary skill in the art, this structure also ensures good WIWNU at low down forces.

In varying embodiments of the present invention, the polishing elements are made of any suitable conducting material such as carbon filled polymer, metal, graphite or combinations thereof. The polishing elements may be of different sizes and may be positioned with varying density across the pad surface.

In still another embodiment of the invention, a copper pad is placed on one platen and barrier pad is placed on another platen to remove copper and barrier materials sequentially, utilizing separate copper and barrier solutions on the anodic and cathodic sides. In varying embodiments, a copper pad has silver nitrate solution on the cathodic side and sulfuric acid on the anodic side. In another embodiment a copper pad has copper sulfate/sulfuric acid solution on the anodic side and silver nitrate on the cathodic side. In yet another embodiment the anodic solution contains an inhibitor such as benzotriazole to inhibit removal of copper.

The present polishing pad overcomes the limitations of conventional pads by providing independently translatable polishing elements. The compliance of the polishing pad is thus decoupled from its planarization capability as well as its electrochemical properties. Polishing elements are sized to be significantly larger than the feature scale in the circuits fashioned on the wafer, but smaller than the individual die sizes. This enables planarization at feature and array levels while providing compliance at the die and wafer levels. The compliant under-layer of the present polishing pad may be selected to provide compliance on the order of wafer level bow and warpage.

In some embodiments of the present invention, the polishing pad may be configured with the capability to quantitatively determine wear of the pad's polishing surface or simply "end of pad life". For example, an "end of pad life" sensor, or more generally a "detection sensor" may be embedded in the pad at a predetermined depth from the top surface (i.e., as measured from the tip of the polishing elements). As the pad wears up to the preset thickness at which the sensor is placed or activated, the sensor detects the wear and provides input to the polishing system.

The end of life sensor may consist of an optically transparent cylindrical plug having a top surface covered with reflective coating. The plug may be embedded in the pad such that the reflective end of the plug is positioned below the top surface of the pad by a predetermined height. A light source and detector are placed in the platen of the polishing apparatus through an optically transparent window. When the light bean is incident on the plug of a new pad, the reflective surface reflects back the light indicating the pad is still within its useful life. However, when the pad has worn to a predetermined level and the top of the plug is approximately level with the now exposed pad surface, the reflective surface will be abraded away and the light will be transmitted through the pad. The resulting change in the reflected light signal intensity thus provides feedback illustrative of the pad wear. This change can be used to determine "end of pad life" (e.g., end of life may be indicated by the reflected signal intensity being at or below a previously established threshold).

The detection hardware may lie below the pad (and platen) or above the pad and that the optical insert can be appropriately modified to detect and interpret the reflected light signal. One or multiple such plugs may be used to determine percentage of remaining pad life. For example, different plugs may be embedded to different depths, corresponding to 25%, 50%, 75% and 100% (or other increments) of pad life. In this way pad wear information can be provided.

In another embodiment of the present invention a single conical plug may mounted flush with the pad surface such that the size of the plug opening exposed during pad usage provides information on the percentage of pad wear and, hence, pad life. In yet another embodiment the plug may have a multi-step surface, which is exposed to varying degrees as the pad wears. The height of the steps may be calibrated to provide information in terms of percentage of pad wear.

In still a further embodiment of the present invention, the pad life sensor plug may contain screens with varying degrees of transmission arranged in order of reflectivity. For example, the top layer may have 100% reflectivity (e.g., full reflectivity for that plug) and be flush (or nearly so) with the new pad surface. At 25% of plug depth, a screen with, say, 75% reflectivity may be embedded, and similarly at 50% of plug depth, a 50% reflectivity screen so embedded and at 75% of plug depth a 25% reflectivity screen so embedded. Of course these relative depths and reflectivity percentages may be varied to achieve similar functionality according to the designer's particular needs.

Initially with such a plug/screen arrangement, the incident beam will be completely reflected and pad life determined to be 100% (i.e., a new pad). As the pad wears, the top reflecting layer is removed and the 75% (and lower) reflectivity screens are engaged. As each such screen is exposed (and subsequently removed by further wear), the remaining pad life can be determined according to the intensity of the reflected signal. A single element can therefore be used to detect and monitor pad life.

In varying embodiments of the present invention, the sensor may be an electrochemical sensor containing two or more probes embedded in the pad at a predetermined depth or depths from the top surface of the pad when new. As the pad wears, exposing the probes, slurry provides electrical connectivity between the probes, and resulting electrical signal paths formed thereby can be used to transmit or transport signals to a detector so as to detect pad wear and, eventually, end of pad life.

In still other embodiments, the sensor may be a conductive plate embedded at a predetermined depth below the surface of a pad when new. An external capacitive or eddy current sensor may be used to detect distance from the conductive plate, hence pad thickness or pad wear. This and other embodiments of the present invention are discussed further below.

The present electro-chemical mechanical polishing pad thus enables the practice of low down force CMP. CMP processes require balance between chemical and mechanical force to achieve removal of material from the high points of a wafer to planarize it. With the advent of damascene processing, copper CMP is becoming a critical process in IC fabrication. Typical copper CMP processes have operated at down forces in the range of 3-5 psi. This operating pressure range is adequate when integrated circuits are manufactured using silicon dioxide as dielectrics to inlay copper interconnects. As more advanced technologies (e.g., for 90 nm, 65 nm and 45 nm) are under consideration and development, however, lower-K dielectrics need to be utilized to achieve desired circuit performance. These low-K materials may be carbon-doped silicon dioxide or made porous for even lower-K performance. Typical Young's modulus value of silicon dioxide is of the order of 70 GPa and it drops to 10-15 Gpa for carbon-doped films. Porous materials are expected to have even lower strengths. It is therefore necessary to mitigate or completely replace the need for down force to achieve desired planarization and removal performance for copper interconnects. The ECMP pad described herein may be used in a variety of steps associated with CMP processing through selection of appropriate polishing elements and anodic and cathodic chemistries wherein the polishing elements are made of conducting materials.

Figure 3A:
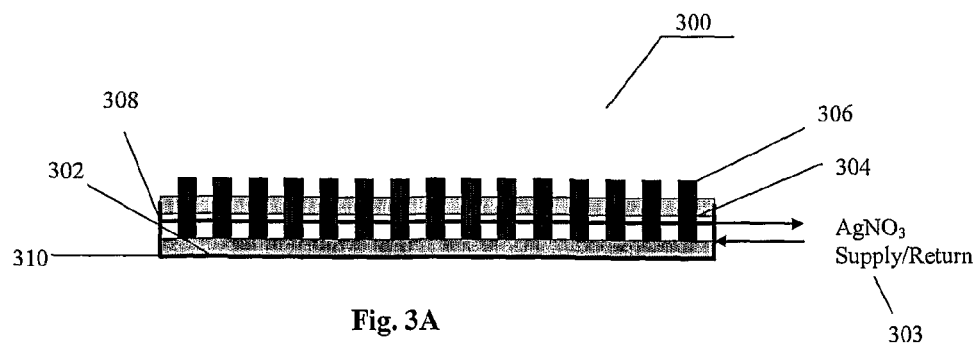
FIGS. 3A, 3B and 3C illustrate cut-away, side profile views of various polishing pads configured in accordance with various embodiments of the present invention.

Turning now to FIG. 3A, a cut-away side profile view of a circular ECMP pad 300 configured according to one embodiment of the present invention is shown. Polishing elements 306 are placed through holes in a guide plate 304 and a proton exchange membrane 308 and are supported by (e.g., affixed to) a compressible (e.g., foam) under-layer 302. Guide plate 304 is connected to a housing 310 to enable separation of the anodic and cathodic sides of the pad. In use, the polishing pad 300 rotates relative to the wafer surface being polished, the surface of the polishing pad making contact with the wafer. A solution supply/return system 303 (not shown in detail) is used to supply/return cathodic fluid (e.g., $AgNO_3$). The cathodic solution supply and return is connected below the proton exchange membrane, forming the cathodic half of the cell. Polishing slurry in contact with the wafer forms the anodic half. Alternately, a predetermined amount of cathodic solution is contained below the proton exchange membrane and no external connections are required.

The compressible under layer 302 provides, among others features, a positive pressure directed toward the polishing surface of the pad when compressed. Typically, the compression may vary around 10% at 5 psi (pounds per square inch), however, it will be appreciated that the compression may be varied dependent upon the materials used in constructing the engineered polishing pad 300 and the type of CMP process. For example, the compressible under layer 302 may be BONDTEX™ made by RBX Industries, Inc.

The foundation of polishing pad is the guide plate 304, which provides lateral support for the conductive polishing elements 306 and may be made of a non-conducting material, such as a polymeric or polycarbonate material. The polishing elements 306 pass through holes in guide plate 306 and may be fixed to the under-layer 302 by an adhesive, such as double sided tape or epoxy. Thus, the polishing elements 306 are free to move in a vertical direction with respect to their long axis, through the holes in guide plate 304. In varying embodiments, the depth and spacing of the holes throughout the guide plate 304 may be varied according to an optimized scheme tailored to specific resolution requirements.

The polishing elements 306 preferably protrude above surface of the guide plate 304, as illustrated. This provides a volume between the interdigitated polishing elements 306 and the guide plate 304 for slurry distribution. In various embodiments, see, e.g., FIG. 3C, the polishing elements may also protrude above a slurry distribution material 312 introduced above the guide plate 304 by, say, 2.5 millimeters or less. It will be appreciated, however, that this value may be greater than 2.5 millimeters depending on the material characteristics of the polishing elements and the desired flow of slurry over the surface. The polishing elements may be of varying geometric shapes (e.g., circular and/or triangular cross sections) and, as indicated above, made from a variety of materials.

The slurry distribution material 312 may include flow resistant elements such as baffles or grooves (not shown), or pores, to regulate slurry flow rate during CMP processing. In varying embodiments, the porous slurry distribution material has between 10 and 90 percent porosity and may be overlaid on guide plate 304. The slurry distribution material may be fastened to the guide plate by an adhesive, such as double sided tape. Additionally, the slurry distribution material may be comprised of various layers of differing materials to achieve desired slurry flow rates at varying depths (from the polishing surface) of the slurry distribution material. For example, a surface layer at the polishing surface may have larger pores to increase the amount and rate of slurry flow on the surface while a lower layer has smaller pores to keep more slurry near the surface layer to help regulate slurry flow.

The polishing elements may be constructed such that they have a base diameter larger than the diameter of the guide plate holes thru which they pass. For example, the body of the polishing elements may have a diameter "a" and the guide plate holes a diameter "b", such that "b" is slightly larger than "a", but nevertheless smaller than diameter "c", which is the diameter of the base of the polishing element. In essence then polishing elements will resemble a cylinder on top of a flat plate. In varying embodiments, the depth and spacing of the holes throughout the guide plate may be varied according to an optimized scheme tailored to specific CMP processes. The polishing elements are each maintained in planar orientation with respect to one other and the guide plate.

Figure 3B:
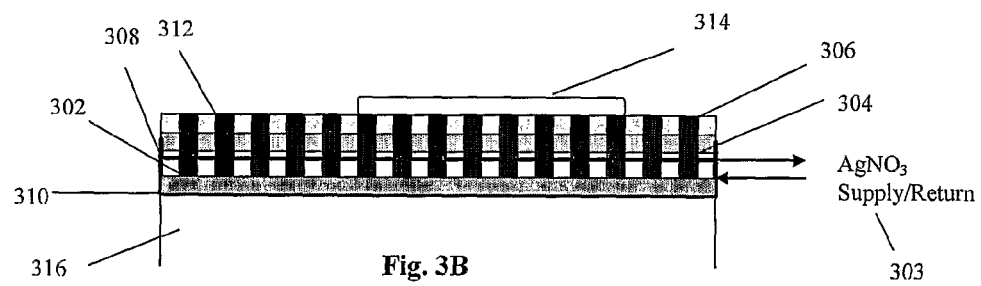
Figure 3C:
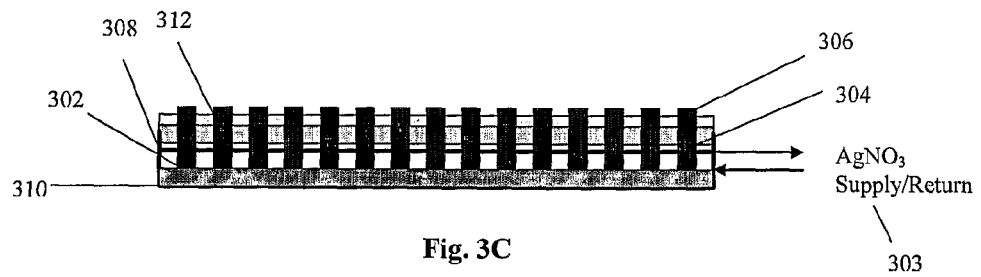

FIG. 3B illustrates a cut-away side profile view of polishing pad 300 as used in CMP processing, according to one embodiment of the present invention. In use, the polishing pad 300 is placed on top of the polish table 316, which rotates relative to the wafer being polished, the polishing elements of the polishing pad make contact with the wafer 314. Cathodic solution is introduced via supply/return system 303, which is connected to the lower, cathodic end of the pad. Wafer 314 is placed in contact with the conducting polishing elements 306 and the electrochemical circuit is completed through direct conduction through the elements 306 and an anodic solution, membrane 308 and the cathodic solution.

Figure 4:
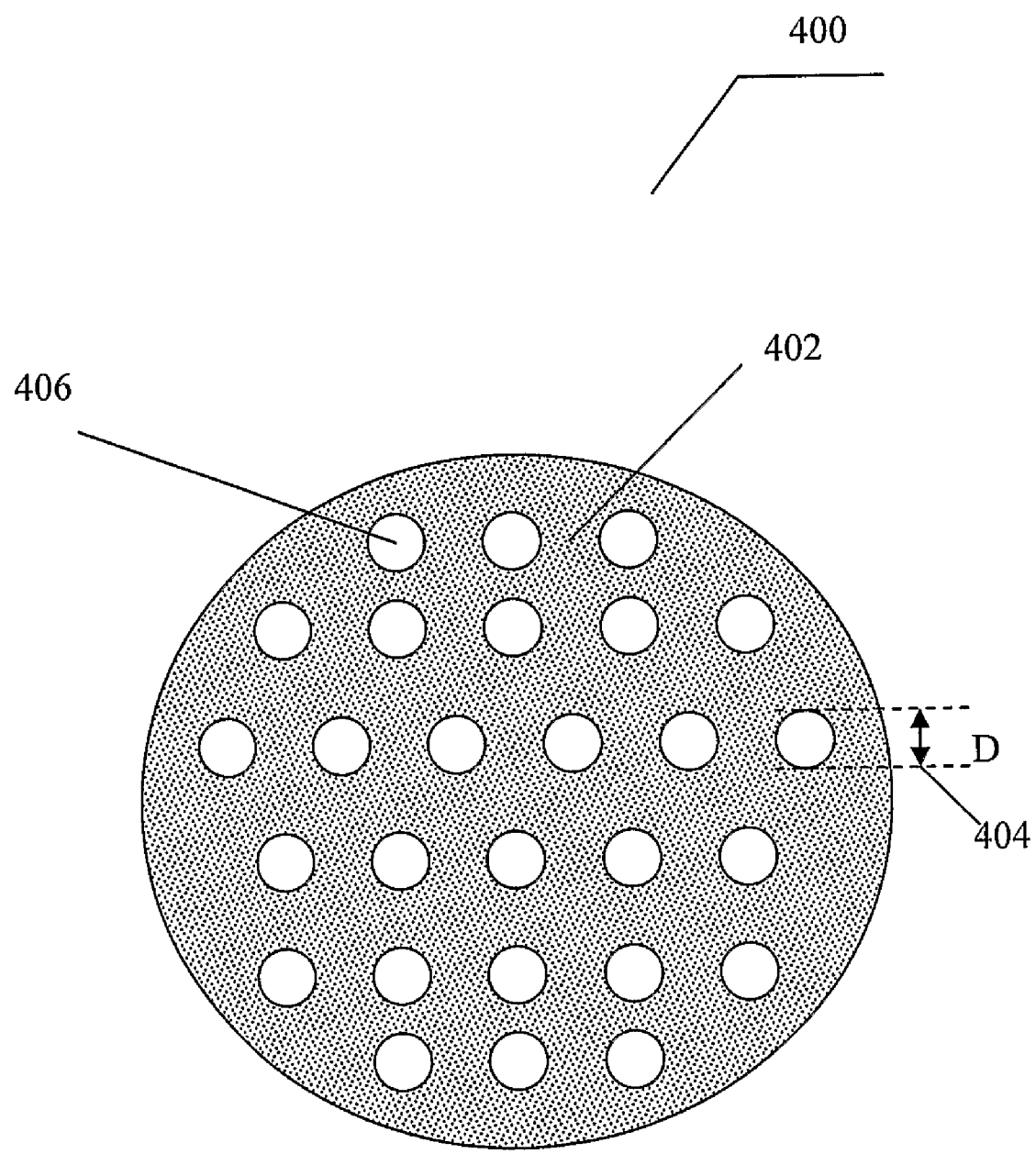
FIG. 4 illustrates a top down view of a polishing pad configured according to a further embodiment of the present invention.

FIG. 4 illustrates a top down view of a polishing pad 400, configured according to one embodiment of the present invention. Conductive polishing elements 406 are interdigitated throughout pad 400. The slurry distribution material 402 is permeated throughout the volume created by conductive polishing elements 406 protruding from the guide plate (not shown). While the volume provides a slurry path, the slurry distribution material provides a mechanism to control slurry flow throughout the volume as discussed above.

The distribution of the conductive polishing elements 406 may vary according to specific polishing/process requirements. In varying embodiments, the conductive polishing elements 406 may have a density of between 30 and 80 percent of the total surface area, as determined by the diameter (D) 404 of each element 406 and the diameter of the polishing pad 400. In one embodiment, the diameter (D) 404 is at least 50 micrometers. In other embodiments, the diameter (D) is between 50 micrometers and 12 millimeters.

The conductive polishing elements may be constructed such that they have a base diameter larger than the diameter of the guide plate holes thru which they pass. For example, the body of the conductive polishing elements may have a diameter "a" and the guide plate holes a diameter "b", such that "b" is slightly larger than "a", but nevertheless smaller than diameter "c", which is the diameter of the base of the conductive polishing element. In essence then the conductive polishing elements will resemble a cylinder on top of a flat plate. In varying embodiments, the depth and spacing of the holes throughout the guide plate may be varied according to an optimized scheme tailored to specific CMP processes. Pad element density is directly related to the material removal rate performance: the higher the pad element density, the higher the removal rate. While a uniform polishing element density pad allows a uniform removal profile, one way to modify the removal profile is to tailor the polishing element density such that a desired removal profile can be achieved. For example, to achieve an edge-fast polish rate, the density of polishing elements may increased in the area where the edge of the wafer comes in contact with the pad. Similarly, removal rates may be increased in the center of the wafer by adjusting polishing element density appropriately. The polishing elements are each maintained in planar orientation with respect to one other and the guide plate.

As indicated above, some polishing pads configured in accordance with embodiments of the present invention incorporate sensors to determine fractional or complete end of pad life (e.g., pad wear leading to end of life). Optical-, electrochemical- or current-based sensors can be used to determine such wear/end of life. The sensors are incorporated into the pad, at one or more predetermined depths below the top surface thereof. The sensors, when exposed by pad wear, enable transmission of optical signals or, in case of electrochemical sensors, electrical conductivity to close circuits, thus enabling the transmission of such signals from the sensors to one or more detectors. In case of eddy current or capacitive sensors, a conductive plate may be embedded below the top surface of the pad and the detector is placed above or below the pad. The thickness of pad between the plate and the sensor thus affects the signal strength as perceived by the detector and is used to determine fractional or complete end of pad life.

Figure 5A:
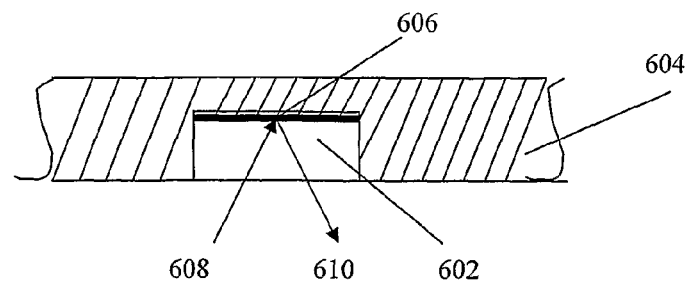
FIGS. 5A-5E show various optical sensor designs which may be used in conjunction with polishing pads configured in accordance with embodiments of the present invention.

FIG. 5A is a cut-away side profile view of an optical sensor 602 embedded in a pad 604. The top surface of the optical sensor 606 is reflective to enable incident beam 608 to be reflected 610 back, while it is below the top surface. Such sensors are useful for some embodiments of the present invention in which the polishing pad is configured with the capability to quantitatively determine wear of the pad's polishing surface or simply "end of pad life". For example, optical sensor 602 may act as an "end of pad life" sensor, or more generally a "detection sensor" embedded in the pad 604 at a predetermined depth from the top surface (i.e., as measured from the tip of the polishing elements) thereof. As the pad wears up to the preset thickness at which the sensor is placed or activated, the sensor detects the wear and provides input to the polishing system.

The sensor 602 is an optically transparent cylindrical plug having a top surface covered with reflective coating. The plug may be embedded in the pad 604 such that the reflective end of the plug is positioned below the top surface of the pad by a predetermined height. A light source and detector are placed in the platen of the polishing apparatus through an optically transparent window. When the light beam is incident on the plug of a new pad, the reflective surface reflects back the light indicating the pad is still within its useful life. However, when the pad has worn to a predetermined level and the top of the plug is approximately level with the now exposed pad surface, the reflective surface will be abraded away and the light will be transmitted through the pad. The resulting change in the reflected light signal intensity thus provides feedback illustrative of the pad wear. This change can be used to determine "end of pad life" (e.g., end of life may be indicated by the reflected signal intensity being at or below a previously established threshold).

It should be apparent that the detection hardware may lie below the pad (and platen) or above the pad and that the optical insert can be appropriately modified to detect and interpret the reflected light signal. One or multiple such plugs may be used to determine percentage of remaining pad life. For example, different plugs may be embedded to different depths, corresponding to 25%, 50%, 75% and 100% (or other increments) of pad life. In this way pad wear information can be provided.

In another embodiment of the present invention a single conical plug may mounted flush with the pad surface such that the size of the plug opening exposed during pad usage provides information on the percentage of pad wear and, hence, pad life. In yet another embodiment the plug may have a multi-step surface, which is exposed to varying degrees as the pad wears. The height of the steps may be calibrated to provide information in terms of percentage of pad wear.

In still a further embodiment of the present invention, the pad life sensor plug may contain screens with varying degrees of transmission arranged in order of reflectivity. For example, the top layer may have 100% reflectivity (e.g., full reflectivity for that plug) and be flush (or nearly so) with the new pad surface. At 25% of plug depth, a screen with, say, 75% reflectivity may be embedded, and similarly at 50% of plug depth, a 50% reflectivity screen so embedded and at 75% of plug depth a 25% reflectivity screen so embedded. Of course these relative depths and reflectivity percentages may be varied to achieve similar functionality according to the designer's particular needs.

Figure 5B:
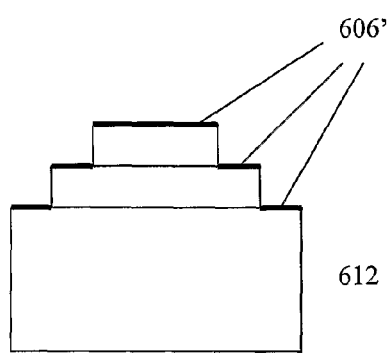
Figure 5C:
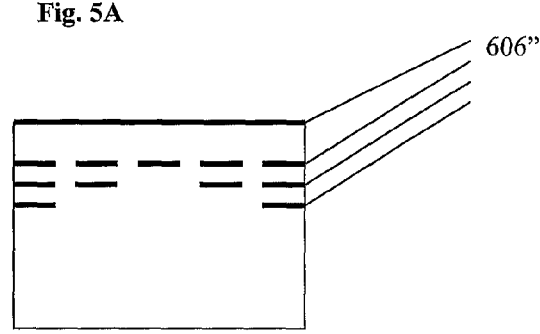
Figure 5D:
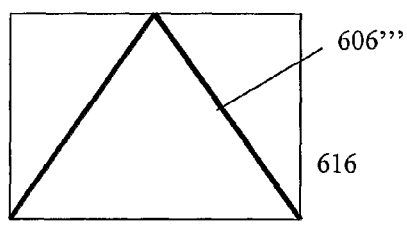
Figure 5E:
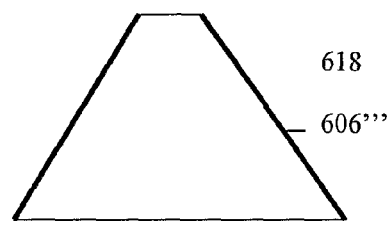

FIGS. 5B-5E show examples of the various optical sensor designs discussed above, which may be used in conjunction with a polishing pad 604 in accordance with embodiments of the present invention. Of course other configurations of optical sensors may also be used. In particular, FIG. 5B shows a multi-step optical sensor 612 with reflective surfaces 606', FIG. 5C shows a single sensor 314 with multiple reflective surfaces 606", FIG. 5D shows another means for incorporating reflecting surfaces into a single sensor. In this case the reflecting surfaces 606''' comprise sides of a triangular cross-section sensor 616. FIG. 5E shows a variable area optical sensor 618 whereby the cross-section area ratio of reflective surfaces 606'''' indicates the fractional pad life remaining. It should be apparent to those of ordinary skill in the art that sensors 612, 614, 616 and 618 can be incorporated in a polishing pad, flush with a top surface of the pad. Changes in reflected light signal intensity provide information on pad wear to determine end of pad life.

Figure 6A:
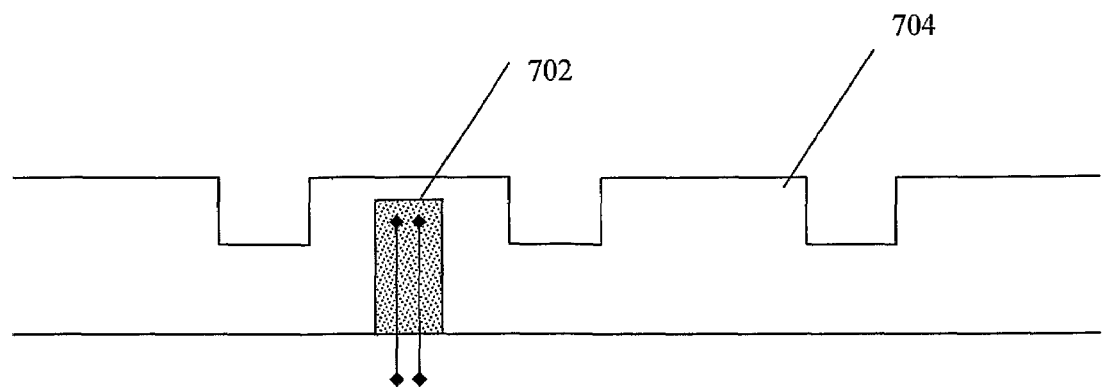
FIG. 6A illustrates an electrochemical sensor positioned below a surface of a new pad in accordance with an embodiment of the present invention.
Figure 6B:
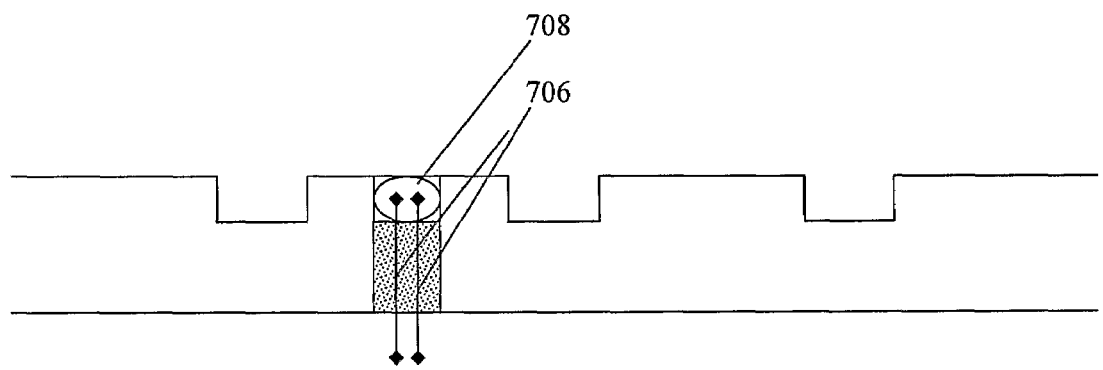
FIG. 6B shows the electrochemical sensor of FIG. 6A exposed as a result of pad wear.

In further embodiments of the present invention, the end-of-life sensor may be an electrochemical sensor containing two or more probes embedded in the pad at a predetermined depth or depths from the top surface of the pad when new. An example of such a configuration is shown in FIG. 6A, which illustrates an electrochemical sensor 702 positioned below a surface of a new pad 704. As the pad wears, exposing the probes, slurry provides electrical connectivity between the probes, and resulting electrical signal paths formed thereby can be used to transmit or transport signals to a detector so as to detect pad wear and, eventually, end of pad life. FIG. 6B shows the electrochemical sensor exposed due to pad wear and probes 706 are connected by the presence of slurry element 708. The continuity in the circuit indicates a certain pad wear has occurred.

Figure 7A:
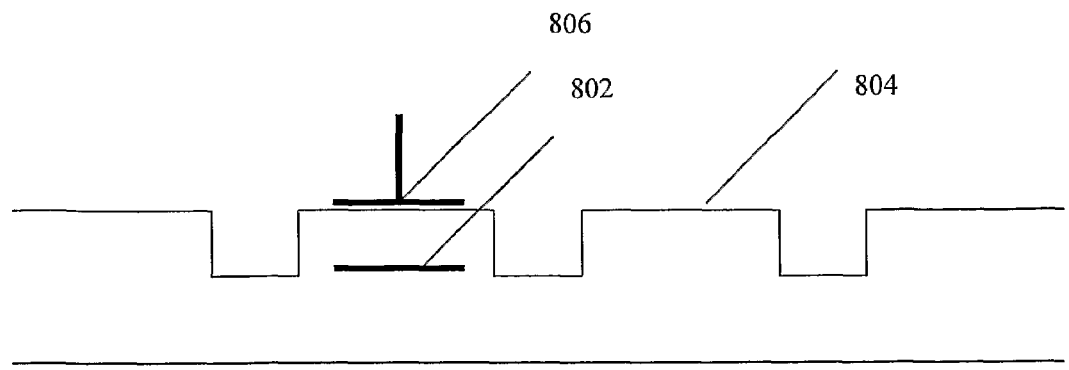
FIG. 7A shows an example of a conductive plate embedded below the surface of a polishing pad in accordance with still a further embodiment of the present invention.
Figure 7B:
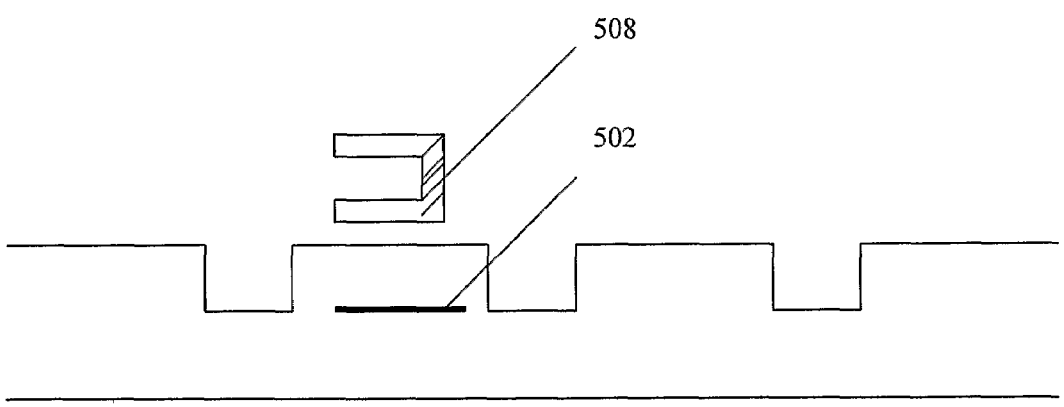
FIG. 7B shows an arrangement with an eddy current sensor held at the top surface of the pad shown in FIG. 7A to assist in determining pad wear in accordance with an embodiment of the present invention.

In still other embodiments of the present invention, the end-of-life sensor may be a conductive plate embedded at a predetermined depth below the surface of a pad when new. An external capacitive or eddy current sensor may be used to detect distance from the conductive plate, hence pad thickness or pad wear. FIG. 7A shows an example of this configuration with conductive plate 802 embedded below the pad surface 804. A capacitive sensor plate 806 is held at the top surface of the pad to determine separation, which is indicative of pad wear. FIG. 7B shows this arrangement with eddy current sensor 808 held at the top surface of the pad to determine separation.

Thus, an improved CMP polishing pad and process for polishing semiconductor wafers and structures layered thereon has been described. Although the present polishing pad and processes for using it have been discussed with reference to certain illustrated examples, it should be remembered that the scope of the present invention should not be limited by such examples. Instead, the true scope of the invention should be measured on in terms of the claims, which follow.

What is claimed is:

1. A polishing pad, comprising:
a guide plate having a plurality of holes therein and being affixed to a compressible under-layer; and
a plurality of conducting polishing elements each affixed to the compressible under-layer and passing through (i) a proton exchange membrane with a sealed contact and (ii) a corresponding hole in the guide plate so as to be maintained in a substantially vertical orientation with respect to the compressible under-layer but being translatable in a vertical direction with respect to the guide plate.

2. The polishing pad of claim 1, further comprising a cathodic solution contained below the proton exchange membrane.

3. The polishing pad of claim 1, wherein at least some of the conducting polishing elements have circular cross sections.

4. The polishing pad of claim 1, wherein at least some of the conducting polishing elements have triangular cross sections.

5. The polishing pad of claim 1, wherein one or more of the polishing elements are fashioned so as to have a cylindrical body.

6. The polishing pad of claim 5, wherein the one or more of the polishing elements have a circular base with a diameter larger than that of the cylindrical body.

7. The polishing pad of claim 1, further comprising a slurry distribution material fastened to the guide plate by an adhesive.

8. The polishing pad of claim 1, further comprising a pad wear sensor embedded at a depth from a top surface of the pad as measured from a working end of one or more of the polishing elements.

9. The polishing pad of claim 8, wherein the pad wear sensor comprises an optically transparent plug having a top surface covered with reflective coating.

10. The polishing pad of claim 8, wherein the pad wear sensor comprises a number of optically transparent plugs embedded to different depths within the pad.

11. The polishing pad of claim 8, wherein the pad wear sensor comprises an optically transparent conical plug mounted flush with the top surface of the pad surface.

12. The polishing pad of claim 8, wherein the pad wear sensor comprises an optically transparent plug having a multi-step surface configured to be exposed to varying degrees as the pad wears.

13. The polishing pad of claim 8, wherein the pad wear sensor comprises an optically transparent plug containing screens with varying degrees of transmission arranged in order of reflectivity.

14. The polishing pad of claim 8, wherein the pad wear sensor comprises an electrochemical sensor containing two or more probes embedded in the pad.

15. The polishing pad of claim 8, wherein the pad wear sensor comprises a conductive plate embedded at a depth below the surface of the pad.

16. A method, comprising,
bringing a surface of a semiconductor wafer into contact with polishing elements of a polishing pad, said polishing elements being affixed to a compressible under-layer of said pad and being maintained in a substantially vertical orientation with respect to the compressible under-layer by a guide plate adjacent to the compressible under-layer and having a number of holes therein, each of the polishing elements passing through a respective one of the holes and also through a proton exchange membrane adjacent to the guide plate, which membrane forms a seal around said polishing elements, the polishing elements thereby being translatable in a vertical direction with respect to the guide plate; and
supplying anodic solution near the surface of the wafer while flowing cathodic solution below the proton exchange membrane so as to form an electrochemical cell.

17. The method of claim 16, further comprising rotating the polishing pad with respect to the wafer so as to cause a metal film on the surface of the wafer to oxidize and dissolve into the anodic solution and metal ions to plate onto a cathode of the electrochemical cell.

18. A method, comprising placing a semiconductor wafer with a copper film thereon in contact with a surface of a polishing pad and supplying a sulfuric acid/copper sulfate solution while flowing silver nitrate solution under a proton exchange membrane of the pad so as to form an electrochemical cell.

19. The method of claim 18, further comprising rotating the polishing pad with respect to the wafer so as to cause the copper film on the wafer to oxidize and dissolve while silver ions plate a cathode of the electrochemical cell.

* * * * *